Nov. 3, 1925.                                           1,560,343
A. C. FOULK
LIQUID LEVEL GAUGE
Filed March 21, 1923
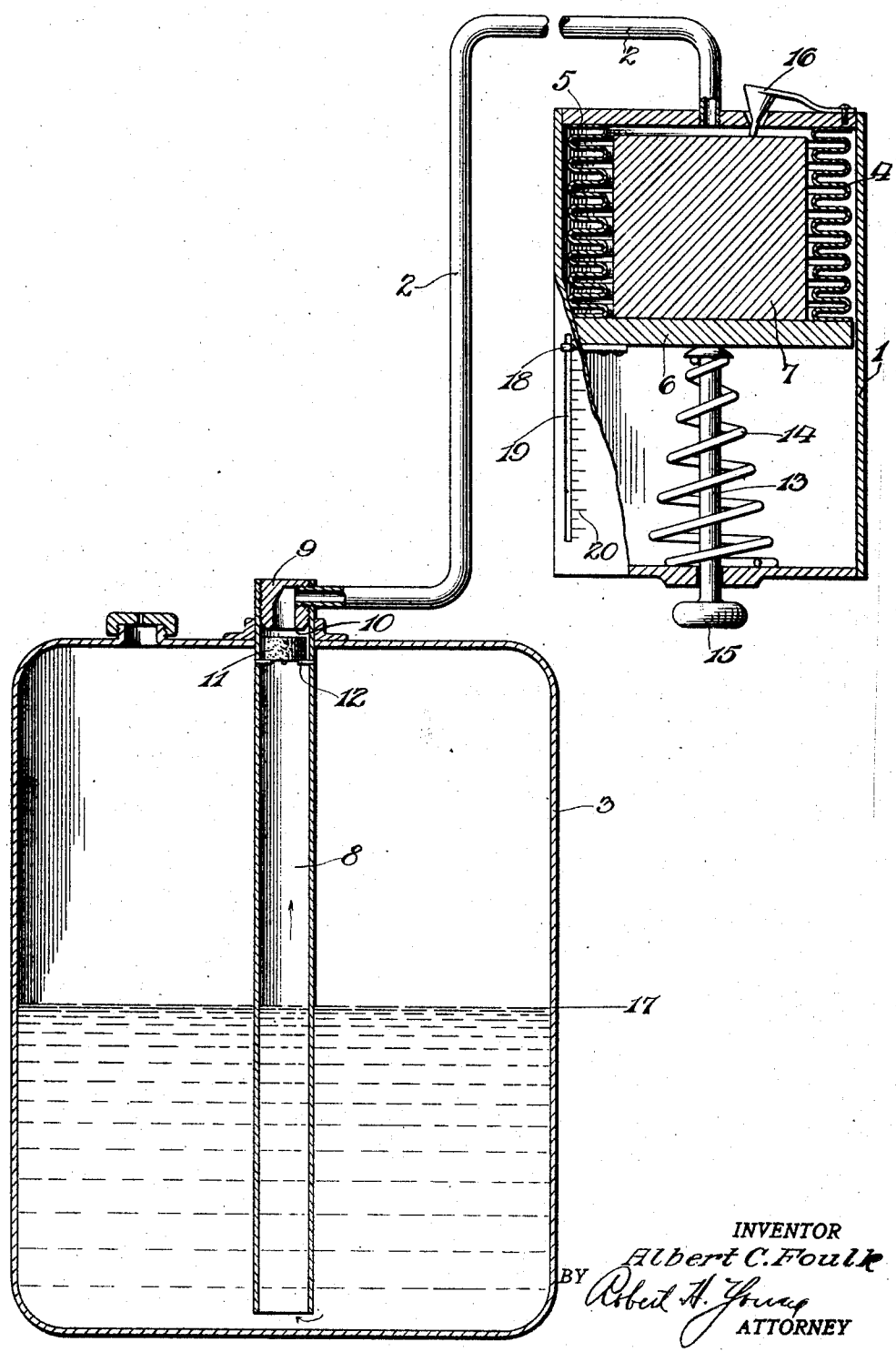
INVENTOR
Albert C. Foulk
BY
ATTORNEY Patented Nov. 3, 1925.

1,560,343

UNITED STATES PATENT OFFICE.

ALBERT C. FOULK, OF DAYTON, OHIO.

LIQUID-LEVEL GAUGE.

Application filed March 21, 1923. Serial No. 626,540.

*To all whom it may concern:*

Be it known that I, ALBERT C. FOULK, a citizen of the United States, residing at Dayton, in the county of Montgomery and State of Ohio, have invented certain new and useful Improvements in Liquid-Level Gauges, of which the following is a specification.

This invention relates to improvements in liquid gauges and it is the principal object of this invention to provide a gauge having an expansible element arranged therein and connected with the indicating means in such a manner as to show the quantity of liquid in a container whenever desired. Further objects will be more fully set forth in the attached specification and claims.

In the drawings the figure represents a sectional elevation of a fuel tank and indicator.

The fluid gauge is shown as applied to a fuel tank and consists of a gauge indicator 1 which is installed in a convenient location on the dash of an automobile or airplane and is connected by tubing 2 to the fuel tank 3. Within the indicator proper is a flexible bellows 4 preferably of metal, which is secured by any suitable means to the upper wall of the indicator proper to form an airtight joint at 5. The lower end of the bellows 4 is attached to the cylindrical base 6 and the greater part of the space within the bellows is taken up by a weight 7 attached to base 6.

Within the fuel tank is a vertical pipe 8, open at the lower end. The upper end of the pipe which extends through the upper wall of the tank is closed by a plug 9 in which is a passage 10 connecting the tubing 2 to the pipe 8. The lower surface of the plug forms a valve seat 10 for a cork float 11 which is normally at rest on projections 12 in the inside of the pipe 8. In this position the tubing 2 is in communication with the liquid in the tank.

Within the lower part of the indicator proper is a plunger 13 urged upwardly against the base 6 by a compression spring 14. A handle or knob 15 extends through lower end of the indicator case to allow the retraction of the plunger 13 by the operator. Normally the spring 14 holds the bellows compressed as shown in the drawing and in this position the weight 7 bears against the end of a valve 16, holding it open and allowing the pressure inside of bellows 4, tubing 2 and pipe 8 to equalize with the outside air pressure. In this position the level of the liquid in the tank and in the pipe 8 is indicated at 17.

When it is desired to determine how much liquid is in the tank the plunger 13 is retracted and the bellows permitted to expand from its compressed initial position. As soon as the bellows starts to expand the valve 16 is closed by the leaf spring and further expansion of the bellows will draw some of the liquid in the tank up pipe 8 until the cork 11 is floated by the liquid. As soon as the cork is floated the cork engages with the valve seat 10 and prevents the further rise of the fluid. The further expansion of the bellows is thus stopped and the position of the same is indicated by a pointer 18 connected to base 6 and extending through a slot 19 in the side of the indicator case. A scale 20 is calibrated to show the number of gallons of liquid in the tank. The added volume inside the bellows is just equal to the total volume of the well when the bellows is expanded to its fullest extent. The distance travelled by the pointer is proportional to the volume of air displaced by the liquid in the tube 8. If the tube 8 is of constant cross section the divisions on scale 20 will therefore be evenly spaced.

Upon releasing the plunger the bellows is again compressed by spring 14, forcing the air back through tube 8 until the fuel in the tube 8 returns to the level of the liquid in the tank. The vent 16 is again opened and the pointer returned to its original position.

I am aware that my invention admits of various modifications and I do not desire to be restricted to the particular construction hereinbefore described.

I claim:

1. A liquid level gauge for a liquid container comprising a pipe projecting into the container through the top of said container, said pipe having its lower end adjacent the bottom of said container and adapted to receive liquid from said container, a float valve in the top end of said pipe, means for displacing the air in said pipe above the liquid level to thereby draw liquid into said pipe to cause the closing of said valve and means controlled by said displacing means for producing an indication proportional to the amount of air displaced, said means comprising an expansible chamber including a resilient bellows, a pipe connecting said expansible chamber to the pipe in said container, spring means normally maintaining said bellows compressed, and hand-operated means for removing the compression on said bellows to allow it to extend and thereby cause liquid to rise in the pipe in the container.

2. A liquid level gauge for a liquid container comprising a pipe projecting into the container through the top of said container, said pipe having its lower end adjacent the bottom of said container and adapted to receive liquid from the container, a float valve in the top end of said pipe, means for displacing the air in said pipe above the normal liquid level to thereby draw liquid into said pipe to cause the closing of said valve and means controlled by said displacing means for producing an indication proportional to the amount of air displaced, said means comprising an expansible chamber including a resilient bellows, a pipe connecting said expansible chamber to the pipe in said container, spring means normally maintaining said bellows compressed, a spring valve to admit air to said expansible chamber when said bellows is compressed and to exclude air when said bellows is expanded, and hand-operated means for removing the compression on said bellows to allow it to extend and thereby cause liquid to rise in the pipe in the container.

In testimony whereof I affix my signature.

ALBERT C. FOULK.